United States Patent
Graham et al.

[11] Patent Number: 5,868,471
[45] Date of Patent: Feb. 9, 1999

[54] PORTABLE HEADREST

[75] Inventors: Benny Graham, 4764-F La Villa Marina, Marina Del Rey, Calif. 90292; Kenneth Tarlow, Corte Madera, Calif.

[73] Assignee: Benny Graham, Marina Del Rey, Calif.

[21] Appl. No.: 953,882

[22] Filed: Oct. 20, 1997

Related U.S. Application Data

[63] Continuation-in-part of Ser. No. 804,610, Feb. 24, 1997, abandoned.

[51] Int. Cl.$^6$ ............................................. A47C 7/38
[52] U.S. Cl. .................... 297/397; 297/391; 297/DIG. 6; 5/640
[58] Field of Search .................... 297/397, 400, 297/391, DIG. 6; 5/640

[56] References Cited

U.S. PATENT DOCUMENTS

| | | | |
|---|---|---|---|
| 2,582,571 | 1/1952 | Thom | 297/397 |
| 3,608,964 | 9/1971 | Earl | 297/397 |
| 3,730,589 | 5/1973 | Lane | 297/391 |
| 4,339,151 | 7/1982 | Riggs | 297/397 X |
| 4,565,405 | 1/1986 | Mayer | 297/397 X |
| 4,619,483 | 10/1986 | Dickey et al. | 297/397 |
| 4,971,393 | 11/1990 | Maisenhalder | 297/397 |
| 4,997,234 | 3/1991 | Royle et al. | 297/397 X |
| 5,015,036 | 5/1991 | Fergie | 297/397 |
| 5,135,283 | 8/1992 | Cassese et al. | 297/397 |
| 5,205,611 | 4/1993 | Stephens | 5/640 X |
| 5,345,633 | 9/1994 | Harnish | 297/397 X |
| 5,503,456 | 4/1996 | Rossini | 297/397 |
| 5,505,523 | 4/1996 | Wang | 297/397 X |
| 5,544,378 | 8/1996 | Chew | 297/397 X |
| 5,567,015 | 10/1996 | Arias | 297/397 |
| 5,613,736 | 3/1997 | Schaked et al. | 297/397 |

*Primary Examiner*—Peter M. Cuomo
*Assistant Examiner*—Rodney B. White

[57] ABSTRACT

A headrest includes a cushion attached to the front of a rigid back. A pair of arms slidably extend from the sides of the rigid back. The ends of the arms are pivotable to an orthogonal portion for clamping to a seatback. The hook portion of a hook-and-loop fastener is attached to the inner side of each end of the arm for grabbing the looped fabric on the seatback. A pair of keyhole-shaped sockets are arranged on opposite ends of the rigid back. An arm is inserted into one of the sockets, and a side bolster is pivotally attached to the arm. The cushion supports a head in a neutral position without requiring the user to lean back, and the side bolster restrains the head from falling to one side. The angle of the side bolster is adjustable for conforming to a leaning head. In a second embodiment, the headrest includes a cushion removably positioned in a recess on a housing. A cylindrical rod extending from a side bolster is inserted into one of a plurality of holes arranged on opposite ends of the housing. The headrest is attachable to a seat with a single strap.

10 Claims, 4 Drawing Sheets

PORTABLE HEADREST

CROSS REFERENCE TO RELATED APPLICATIONS

This is a continuation-in-part of application Ser. No. 08/804,610, filed Feb. 24, 1997, now abandoned.

STATEMENT REGARDING FEDERALLY SPONSORED RESEARCH OR DEVELOPMENT

Not applicable.

BACKGROUND OF THE INVENTION

1. Field of the Invention

This invention relates generally to add-on headrests for attaching to vehicle seats.

2. Prior Art

Most vehicles, such as automobiles and airplanes, have seats with integral headrests. Most of such headrests are not adjustable, and are fixed too far back to support a head in a neutral position generally aligned with a torso. A user must lean back to engage the headrest, but such a position is uncomfortable. Further, most built-in headrests lack side bolsters, so that the user is restricted to a vertical position to keep his or her head upright, otherwise it will tend to fall to one side when the user falls asleep.

U.S. Pat. Nos. 313,781 to Starr et al. and 242,380 to Sharp show headrests for attaching to chairs without built-in headrests. However, they require the user to lean back, and are substantially flat, so that they cannot restrain the head from falling to one side. U.S. Pat. Nos. 5,613,736 to Schaked et al.; 5,505,523 to Wang; 4,619,483 to Dickey et al.; 4,339,151 to Riggs; 2,719,577 to Eyman; 2,638,152 to Pulsifer; and 2,587,196 to Morecroft show side bolster headrests for strapping or clamping onto seatbacks. Although they restrain the head from falling to one side, they still require the user to lean back. U.S. Pat. No. 2,464,435 to Conradt shows a headrest with side bolsters which are each adjustable about a vertical axis. However, the side bolsters are vertical, so that they do not conform to the user's face for optimal comfort when the user is leaning sideways. Their height is fixed, so that they do not fit every user. They require three straps to attach to a seat, so that installation is inconvenient. Further, the central cushion for the back of the head is not easily washable or replaceable.

OBJECTS OF THE INVENTION

Accordingly, objects of the present headrest are:

easy, removable attachment to a seat;

to support the side of a head to prevent it from falling sideways;

to support the head in a comfortable neutral position, so that the user does not have to lean back;

to conform to the angle of a leaning head;

to provide a central cushion for the back of the head which is easily washable and replaceable; and collapsibility for convenient storage and transportation.

Further objects of the present invention will become apparent from a consideration of the drawings and ensuing description.

BRIEF SUMMARY OF THE INVENTION

A headrest includes a cushion attached to the front of a rigid back. A pair of arms slidably extend from the sides of the rigid back. The ends of the arms are pivotable to an orthogonal portion for clamping to a seatback. The hook portion of a hook-and-loop fastener is attached to the inner side of each end of the arm for grabbing the looped fabric on the seatback. A pair of keyhole-shaped sockets are arranged on opposite ends of the rigid back. An arm is inserted into one of the sockets, and a side bolster is pivotally attached to the arm. The cushion supports a head in a neutral position without requiring the user to lean back, and the side bolster restrains the head from falling to one side. The angle of the side bolster is adjustable for conforming to a leaning head. In a second embodiment, the headrest includes a cushion removably positioned in a recess on a housing. A cylindrical rod extending from a side bolster is inserted into one of a plurality of holes arranged on opposite ends of the housing. The headrest is attachable to a seat with a single strap.

DRAWING REFERENCE NUMERALS

| | |
|---|---|
| 10. Cushion | 11. Plate |
| 12. Rigid Back | 13. Arms |
| 14. Housing | 15. Ratchet |
| 16. Buttons | 17. Ends |
| 18. Hooks | 19. Sockets |
| 20. Rod | 21. Key |
| 22. Retaining Loops | 23. Side Bolster |
| 24. Clips | 25. Integral Headrest |
| 26. Seat | 27. Back |
| 28. Lower Portion | 29. Upper Portion |
| 30. Cushion | 31. Recess |
| 32. Sockets | 33. Rod |
| 34. Side Bolster | 35. Strap |
| 36. Ears | 37. Hook-And-Loop Fastener |

DETAILED DESCRIPTION OF THE INVENTION

Figure 1:
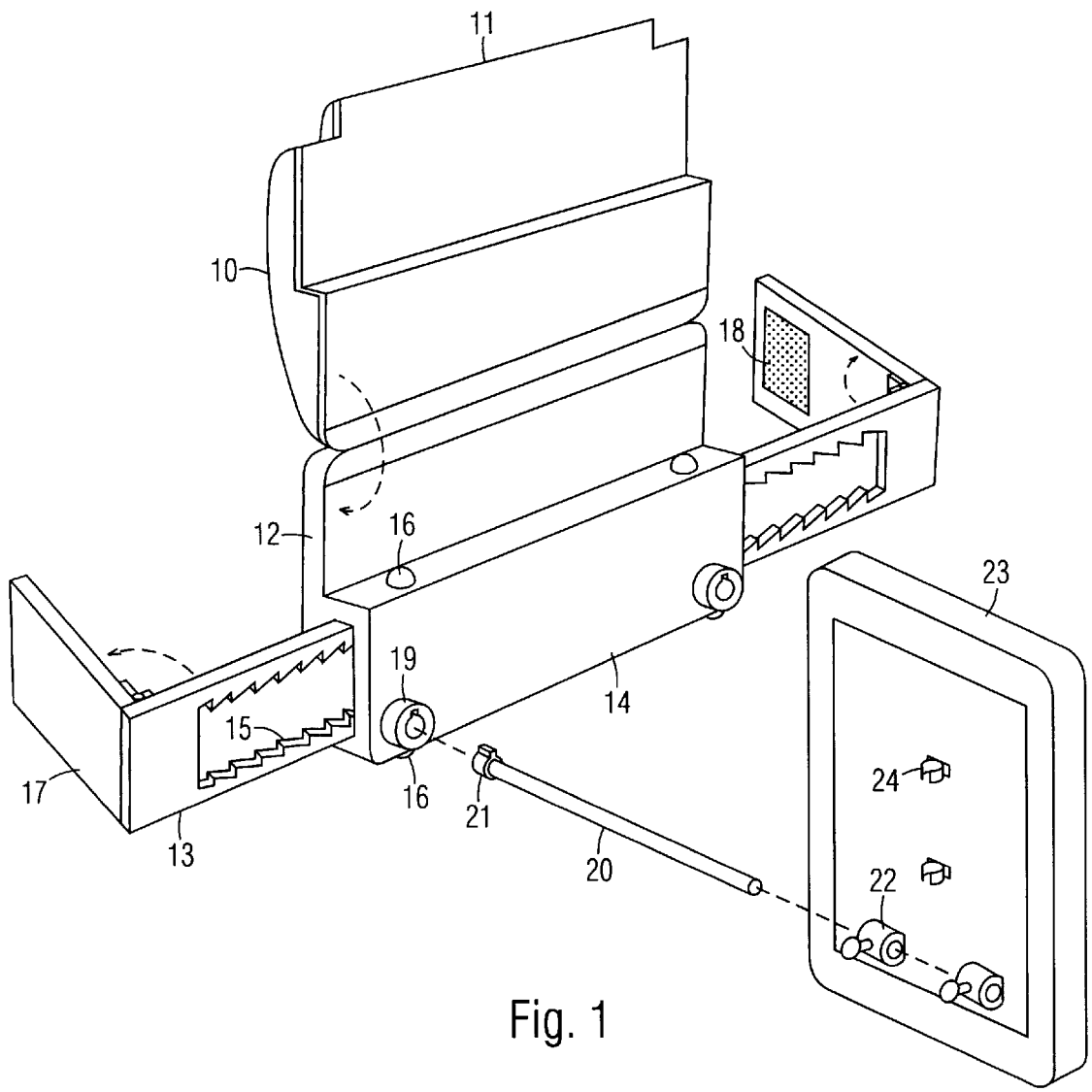
FIG. 1 is a front perspective exploded view of a portable headrest in accordance with a first embodiment of the invention.

FIGS. 1–5:

In accordance with a first embodiment of the invention shown in the front perspective view in FIG. 1, a headrest includes a cushion 10 attached to a plate 11, which is hingeably attached to a rigid back 12. A pair of extendable arms 13 slidably extend from opposite ends of a hollow housing 14 on back 12. Ratchet teeth 15 arranged on arms 13 engage the inner ends of buttons 16, so that arms 13 are locked into a selected position. Ends 17 of arms 13 are hinged for pivoting and stopping at an orthogonal position relative to the inner portions. The hook portion of a hook-and-loop fastener 18 is attached to the inner side of each end 17 for gripping the looped fabric of a typical car or airplane seat. A pair of keyhole-shaped sockets 19 are attached to opposite lower ends of back 12. A rod 20 has a key 21 at one end for inserting into one of the sockets 19. A pair of retaining loops 22 are attached to the outer side of a cushioned side bolster 23 for connecting to rod 20. A pair of spring clips 24 are also attached to the outer side of side bolster 23.

Figure 2:
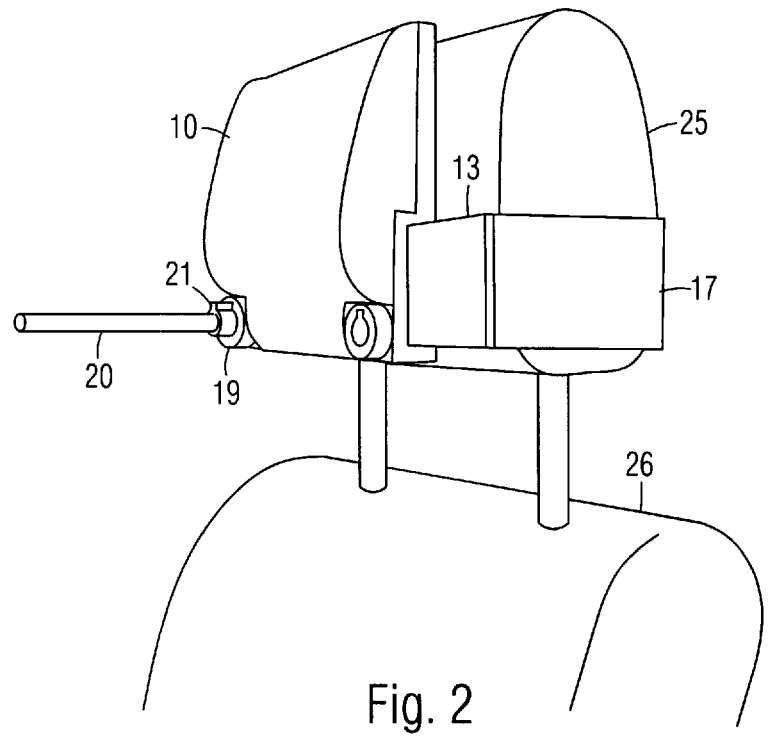
FIG. 2 is a side perspective view of the headrest being installed on a seat.
Figure 3:
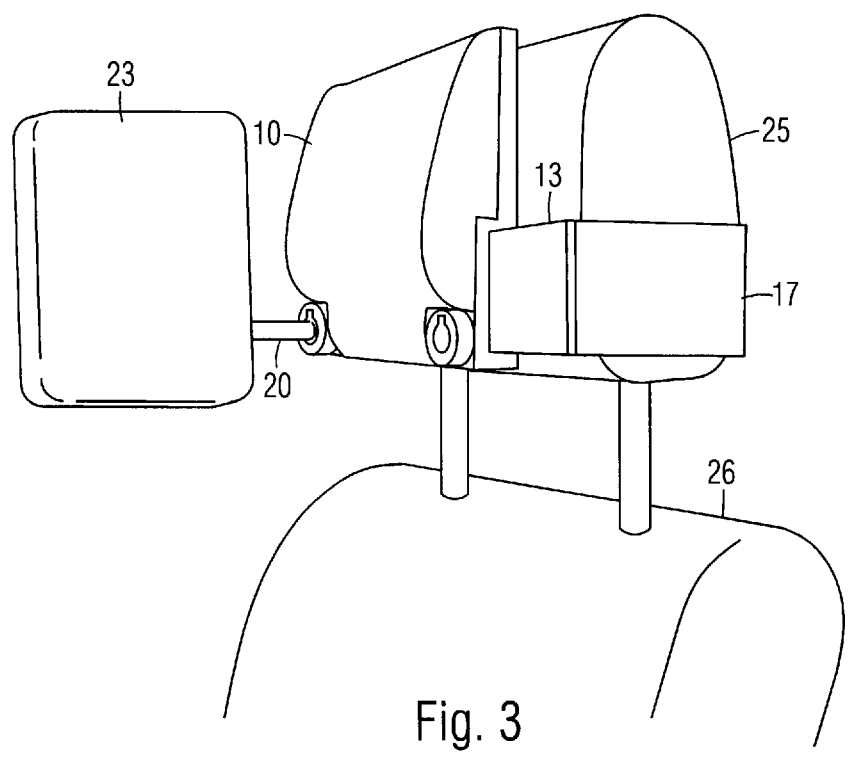
FIG. 3 is a side perspective view of the headrest installed on a seat.

The headrest is installed on a built-in headrest 25 of a seat 26 by pivoting ends 17 outwardly, pressing buttons 16 to release arms 13, sliding arms 13 inwardly until ends 17 are clamped around the sides of the seat, and closing cushion 10 on back 12, as shown in FIG. 2. Key 21 on rod 20 is inserted into one of the sockets 19, and locked into position by rotating it after it is fully inserted. Side bolster 23 is finally attached to rod 20, as shown in FIG. 3.

Figure 4:
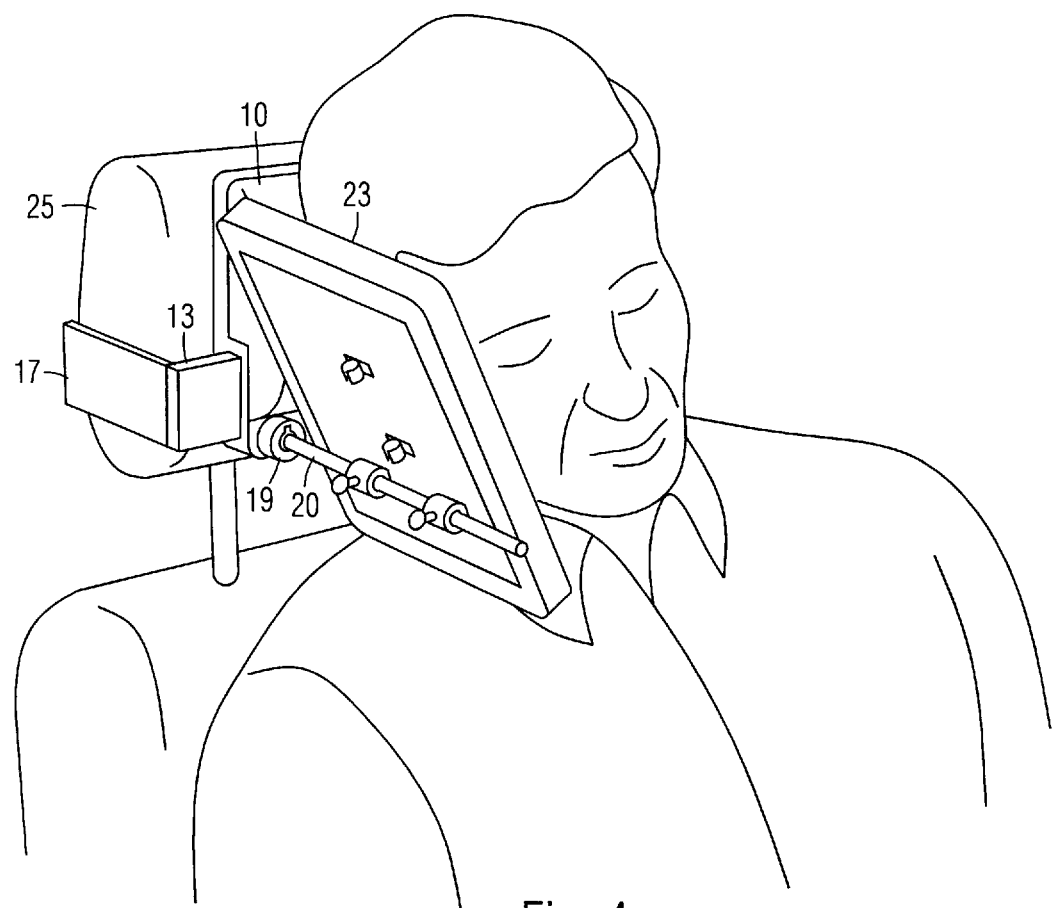
FIG. 4 is a front perspective view of the headrest in use.
Figure 5:
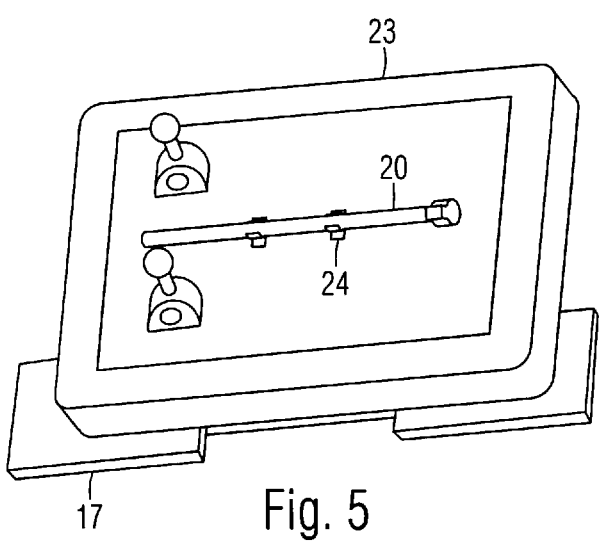
FIG. 5 is a front perspective view of the headrest detached from the seat and folded for transportation or storage.

In use, cushion 10 bridges the gap between built-in headrest 25 and the back of a user's head, so that it supports the head in a neutral position that does not require the user to lean back, as shown in FIG. 4. Side bolster 23 supports the side of the head to restrain the head from falling sideways. Side bolster 23 is adjustable in angle by pivoting it about rod 20, so that it comfortably conforms to the side of the head when the user is leaning slightly. Side bolster 23 may be positioned on either side of the head by inserting rod 20 in a corresponding socket 19. The headrest may be easily detached from the seat and folded for transportation or storage. As shown in FIG. 5, rod 20 is stored in clips 24 on side bolster 23.

Figure 6:
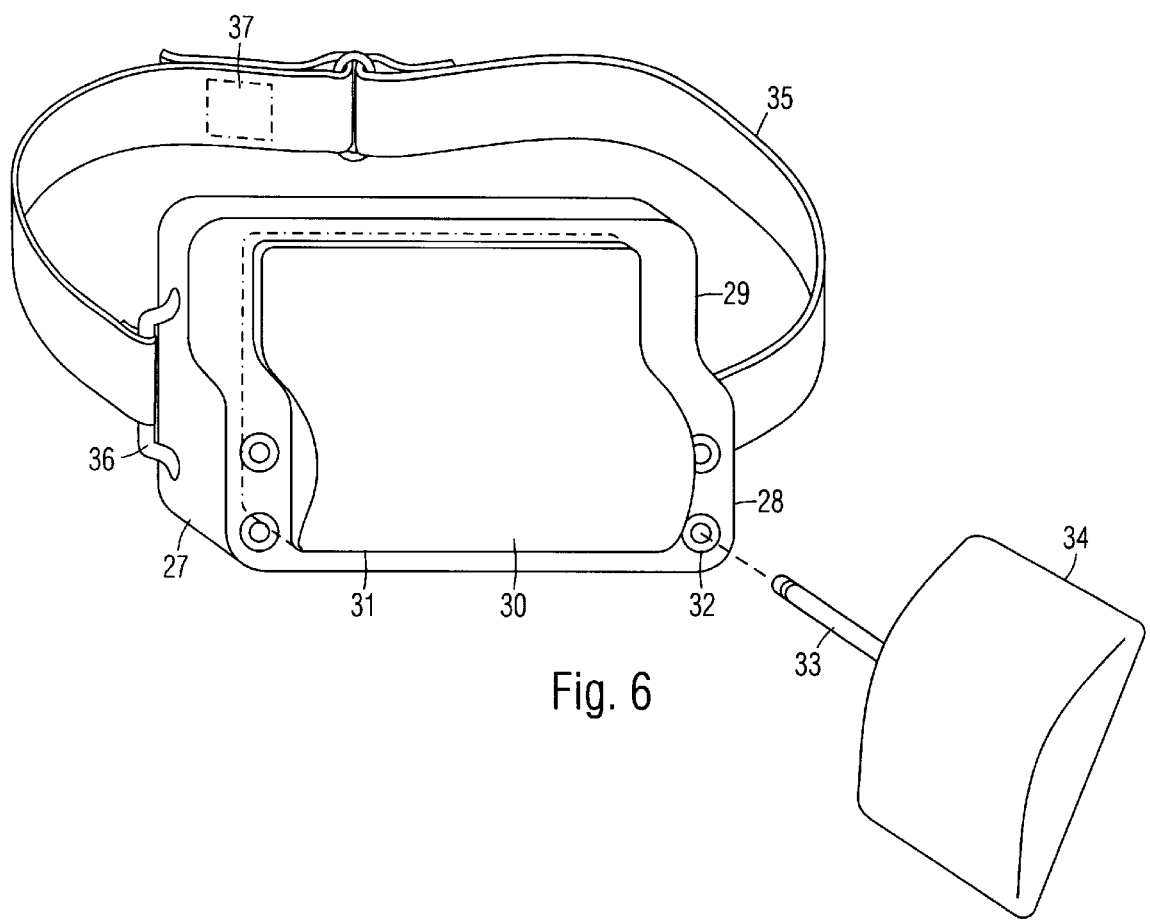
FIG. 6 is a front perspective view of a second embodiment of the headrest.

FIG. 6:

In accordance with a second embodiment of the invention shown in the front perspective view in FIG. 6, a headrest includes a rigid back 27 having a lower portion 28 which is thicker than an upper portion 29 for conforming to the neck and the back of the head, respectively. A cushion 30 is removably positioned in a recess 31 on the front side of back 27. A pair of sockets 32 are arranged on each end of back 27. A cylindrical rod 33 extending from a cushioned side bolster 34 may be inserted into a socket 32 on either side of housing 27 for cushioning either side of the head. Upper and lower sockets are provided on each end of back 27 to enable side bolster 34 to be positioned at different heights. Opposite ends of a strap 35 are attached to a pair of ears 36 (one shown) on opposite sides of back 27. Strap 35 is secured by a hook-and-loop fastener 37. The single strap 35 enables the headrest to be quickly installed and removed. Cushion 30 is easily removable from back 27 for washing or replacement. Rod 33 is free to rotate within socket 32, so that it automatically adjusts to the angle of the head.

SUMMARY AND SCOPE

Accordingly, we have provided a headrest which is easily and removably attachable to a seat. It supports the side of a head to prevent it from falling sideways. It supports the head in a comfortable neutral position, so that the user does not have to lean back. It automatically conforms to the angle of a leaning head. It provides a cushion for the back of the head which is easily washable or replaceable. It is collapsible for convenient storage and transportation.

Although the above descriptions are specific, they should not be considered as limitations on the scope of the invention, but only as examples of the embodiments. Many substitutes and variations are possible within the teachings of the invention. Therefore, the scope of the invention should be determined by the appended claims and their legal equivalents, not by the examples given.

We claim:

1. A portable headrest for removably attaching to a seat, comprising:

a hollow housing having a front, a back, a top end, a bottom end, and opposite sides, said housing for supporting a back of a head of a user;

a pair of opposite arms extending through corresponding opposite sides of said housing, said arms being slidable in and out of said sides, each of said arms including an outer end hinged to an inner portion thereof, said outer end being pivotable to a generally orthogonal position relative to said inner portion for clamping onto a seatback of said seat;

a plurality of sockets arranged on said front of said housing adjacent said opposite sides; and a side bolster having a rod extending therefrom, said rod inserted into a selected one of said sockets for supporting a side of said head of said user.

2. The portable headrest of claim 1, wherein said sockets comprise keyhole-shaped sockets, and an end of said rod includes a key insertable into said keyhole-shaped sockets.

3. The portable headrest of claim 1, further including a ratchet arranged on said each of said arms, and a button arranged on said housing engaging said ratchet, said button being operable to lock said arms in selected positions and release said arms for sliding adjustment.

4. The portable headrest of claim 1, further including a plate hinged to said top end of said housing, and a cushion attached to a front side of said plate, said plate being pivotable to a closed position on said front of said housing.

5. A portable headrest for removably attaching to a seat, comprising:

a housing with a front, a back, a top end, a bottom end, and opposite sides;

a pair of ears attached to said opposite sides of said housing;

a strap connected between said ears for strapping said headrest to a seatback of said seat;

a hollow recess arranged on said front of said housing;

a cushion positioned in said recess for supporting a back of a head of a user;

a plurality of sockets arranged on said housing adjacent said opposite sides; and a side bolster having a rod extending therefrom, said rod removably inserted into a selected one of said sockets for supporting a side of said head of said user.

6. The portable headrest of claim 5, wherein said housing includes a thinner upper portion, and a thicker lower portion for respectively conforming to said back of said head and a neck of said user.

7. The portable headrest of claim 5, wherein said cushion is removably attached in said recess.

8. A portable headrest for removably attaching to a seat, comprising:

a housing with a front, a back, a top end, a bottom end, and opposite sides;

a pair of ears attached to said opposite sides of said housing;

a strap connected between said ears for strapping said headrest to a seatback of said seat;

a hollow recess arranged on said front of said housing;

a cushion positioned in said recess for supporting a back of a head of a user;

a plurality of sockets arranged on said housing adjacent said opposite sides; and a side bolster having a rod extending therefrom, said rod removably inserted into a selected one of said sockets for supporting a side of said head of said user, said rod being freely rotatable within said sockets, so that said side bolster automatically adjusts to an angle of said head when said user is leaning sideway.

9. The portable headrest of claim 8, wherein said housing includes a thinner upper portion, and a thicker lower portion for respectively conforming to said back of said head and a neck of said user.

10. The portable headrest of claim 8, wherein said cushion is removably attached in said recess.

* * * * *